United States Patent
Schuessler

(10) Patent No.: US 7,481,984 B1
(45) Date of Patent: Jan. 27, 2009

(54) SYSTEM FOR HEATING AND/OR CONVERTING AT LEAST ONE MEDIUM

(75) Inventor: Martin Schuessler, Ulm (DE)

(73) Assignee: NuCellSys GmbH, Kirchheim/Teck-Nabern (DE)

(*) Notice: Subject to any disclaimer, the term of this patent is extended or adjusted under 35 U.S.C. 154(b) by 1811 days.

(21) Appl. No.: 09/662,849

(22) Filed: Sep. 15, 2000

(30) Foreign Application Priority Data

Sep. 15, 1999 (DE) ................. 199 44 186

(51) Int. Cl.
   *B01J 8/04* (2006.01)
(52) U.S. Cl. ............... 422/190; 422/198; 422/199; 422/200
(58) Field of Classification Search .............. 422/173, 422/180, 198, 190, 199, 200; 428/548; 502/527.12, 502/527.13; 48/61, 127.9; 429/20
   See application file for complete search history.

(56) References Cited

U.S. PATENT DOCUMENTS

| | | | |
|---|---|---|---|
| 5,015,444 A | 5/1991 | Koga et al. | 422/195 |
| 5,209,906 A * | 5/1993 | Watkins et al. | 422/200 |
| 5,270,127 A * | 12/1993 | Koga et al. | 429/17 |
| 5,316,747 A * | 5/1994 | Pow et al. | 423/247 |
| 5,534,328 A | 7/1996 | Ashmead et al. | 428/166 |
| 6,159,434 A * | 12/2000 | Gonjo et al. | 422/191 |
| 6,447,736 B1 * | 9/2002 | Autenrieth et al. | 422/190 |
| 6,517,805 B1 * | 2/2003 | Schuessler et al. | 423/648.1 |
| 7,001,575 B2 * | 2/2006 | Cwik et al. | 422/220 |

FOREIGN PATENT DOCUMENTS

| | | |
|---|---|---|
| DE | 195 34 433 | 10/1996 |
| DE | 197 20 294 | 12/1998 |
| DE | 197 43 673 | 4/1999 |
| DE | 198 32 625 | 2/2000 |
| DE | 199 01 301 | 3/2000 |
| DE | 198 47 987 | 4/2000 |
| EP | 0 878 442 | 11/1998 |
| EP | 0 906 890 | 4/1999 |
| EP | 0 974 392 | 1/2000 |
| EP | 0 994 068 | 4/2000 |
| JP | 7-126001 | 5/1995 |

\* cited by examiner

Primary Examiner—N. Bhat
(74) Attorney, Agent, or Firm—Crowell & Moring LLP

(57) ABSTRACT

A system for heating and/or converting at least one medium, such as an evaporator, a reactor or a heat exchanger, has layers arranged in a stack which layers are formed by pressing catalyst material. Devices are provided for dividing the stack into a number of separate function areas.

16 Claims, 3 Drawing Sheets

SYSTEM FOR HEATING AND/OR CONVERTING AT LEAST ONE MEDIUM

This application claims the priority of German patent document 199 441.86.3, filed 15 Sep. 1999, the disclosure of which is expressly incorporated by reference herein.

BACKGROUND AND SUMMARY OF THE INVENTION

The present invention relates to a system for heating or converting at least one medium, having an evaporator, a reactor and a heat exchanger.

Gas generating systems for fuel cells contain various components operated at different temperature levels, through which the flow takes place in a specified sequence. The various components have partially separate apportioning units, and are either linked in separate housings or by pipe systems, or are coupled in a housing to form multifunction units.

U.S. Pat. No. 5,015,444 discloses a plate reactor for reforming hydrocarbons which has upper and lower end plates, as well as plates in between, which are arranged in a stack and define media spaces. The media flows over the plates (which consist of massive metal plates), parallel to the plane of the plates. The catalyst is placed in the form of a charge or in the form of a coating.

Japanese Patent Document JP-7-126001 discloses a system in which the essential components of a gas generating system are joined to form a compact unit.

European Patent Document EP 0 906 890 A1 discloses a system of the above mentioned type for generating hydrogen from hydrocarbons or alcohol while feeding a reaction mixture comprising hydrocarbon or alcohol and water to a catalyst. The catalyst is produced by pressing at least one catalyst powder into a very compressed layer which forms a molded body. Thus, the reaction mixture can be pressed through the catalyst layer, with a corresponding pressure drop.

Other components of a gas generating system which are constructed of pressed layers through which the medium flows are known from German Patent Documents DE 197 20 294 C1 (evaporator/reformer), DE 199 01 301.2 (reformer/gas purification, no prior publication), DE 198 47 987.5 (Process for Producing Such Layers, no prior publication), DE 198 32 625.4 (Production of a Stacked Body, no prior publication).

Finally, in German Patent Document DE 195 34 433 C1, the medium which is to be reformed flows over a pressed catalyst layer for a methanol reforming reactor. The catalyst layer is formed by a compressed metal-foam carrier layer in whose pores the catalyst material is fixed. After charging with the catalyst material, the layers are compressed to fix the catalyst material.

Particularly for mobile applications, a high degree of integration must be achieved in order to keep the mass of such systems as small as possible, while minimizing the costs. When such a system is used, the reactions taking place therein are coupled to narrow operating temperature ranges. Particularly when used in mobile applications, such as vehicles which are driven by fuel cell systems, temperature fluctuations and cold starting conditions are critical in the case of such modular plate structures.

It is therefore an object of the invention to provide a system for heating and/or converting at least one medium, in which different function areas can be combined while creating a degree of integration which is as high as possible.

This and other objects and advantages are achieved according to the invention by subdividing the stack formed of pressed layers into a number of function areas. In this manner, a high degree of integration can be achieved, for example, in a system for generating hydrogen from methanol and water. It is possible, for example, to implement an evaporator and a catalytic reactor, which, in turn, may be divided into different stages, within one plate stack.

A low overall mass of the hot reaction area reduces the amount of heat required for the cold start. In addition, a compact shape of the hot reaction area facilitates thermal insulation.

A preferred embodiment of the invention has insulating plates which divide the layers into thermally essentially mutually insulated function areas. By arranging insulating layers between the individual layers arranged in a stack, individual thermally mutually insulated function areas can be defined simple manner in which, for example, different temperatures exist. This measure can be implemented at very reasonable cost.

The layers can also be arranged expediently between a lower and an upper end plate, favorably influencing the mechanical stability of the system according to the invention.

According to another preferred embodiment of the system according to the invention, the insulating plates extend essentially in parallel to the reactive layers of the system. As a result, areas of different functionality can easily be defined in a flow direction of a medium to be reacted.

Insulators can also be provided between the end plates and the adjacent layers, thereby ensuring that the end plates can be thermally uncoupled from the plates forming the media spaces, so that a desired operating temperature can be reached more rapidly in the media spaces. In systems which include components that have a high thermal capacity (such as massive end plates made of steel), and which, in addition, require a mechanical support when installed into a system to be operated, the influence of the unavoidable thermal coupling to the mechanical supports is reduced in this manner.

Advantageously, the end plates are made of aluminum. While their weight low, such end plates have a good mechanical stability as long as they have a significantly lower temperature than those in the hydrogen-releasing zone.

According to another preferred embodiment of the invention, the system has devices for clamping the layers between the two end plates, achieving a simple and stable construction, In this manner, a good sealing effect can also be achieved if seals are provided, for example, between the individual layers. The devices for clamping the layers between the end plates can apply pressure force to the seals. Such clamping devices are expediently constructed as tie rods, tension members or similar devices. Tie rods are available at reasonable cost and have been found to be robust and reliable in practice.

Advantageously, edge areas of the layers are sealed off from the environment, preventing the emission of reaction products into the ambient air, which would reduce the efficiency achievable by means of the system according to the invention. The layer edges can be sealed, for example, by soldering or metal spraying, or by using other materials.

It was further found to be expedient to provide higher temperature function areas in the interior of the stack, so that they can be optimally thermally insulated.

It was further found to be expedient to provide insulation which surrounds the entire stack, so that low heat losses (and therefore high efficiencies) can be achieved.

It is also advantageous to arrange the end plates and the clamping devices outside the thermally insulated layer.

According to a particularly preferred embodiment of the system according to the invention, educt ducts extend through at least a portion of the layers, so that individual function areas can be selectively acted upon by respective educts. Also, connecting ducts can be provided which extend through at least a portion of the layers and which guide educts or products from at least a first function area into at least a second one; In addition, product ducts can be provided for removing educts or reaction products heated or formed in the individual function areas from the respective function areas. As a result of such a selective admission, function areas can be defined in a simple manner, and a particularly high degree of integration can be achieved. The combination of this measure with the construction of insulating plates was found to be particularly advantageous for providing thermally mutually insulated function areas. For example, several identical function units can be provided within the stack which are thermally mutually insulated. As a result of such a modular construction, it is possible (for example, during a cold start) to only act upon (for example, heat or keep warm) individual function areas, while nevertheless ensuring an operable unit.

Expediently, for acting upon different function areas by means of the same educt, different educt ducts are provided, which communicate selectively with the respective function areas, and/or different product ducts are provided for removing the products from the respective function areas. Such ducts can essentially extend parallel to one another and, as a result of the corresponding construction of openings, can communicate only with certain function areas.

Other objects, advantages and novel features of the present invention will become apparent from the following detailed description of the invention when considered in conjunction with the accompanying drawings.

DETAILED DESCRIPTION OF THE DRAWINGS

Figure 1:
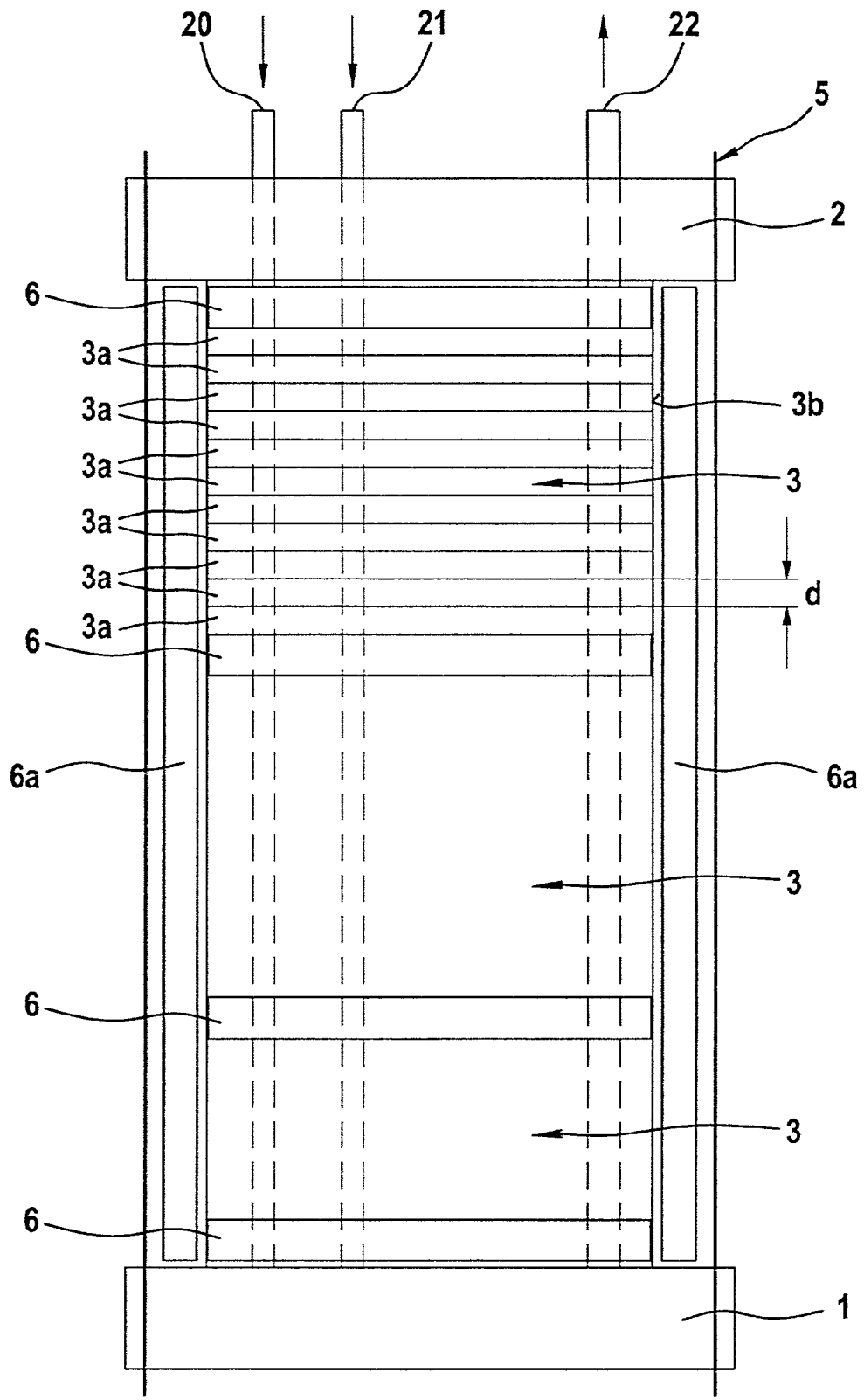
FIG. 1 is a schematic lateral, partially sectional view of a preferred embodiment of the system according to the invention.

A first preferred embodiment of the system according to the invention is illustrated in FIG. 1. Layers 3a, which are stacked above one another and form respective function units 3 (only shown in detail for the upper function area) are separated from one another by insulating plates 6. The insulating plates 6 as well as the layers 3a are arranged and clamped between a lower end plate 1 and an upper end plate 2 by means of a (schematically illustrated) tie rod system 5.

The layers 3a or the function areas 3 are also constructed laterally of another insulation 6a, so that the function areas 3 are essentially thermally insulated with respect to the environment by the upper and lower insulating plate 6 as well as this insulation 6a.

The individual layers 3a are formed by the pressing of catalyst material. The individual layers form molded bodies with a thickness d which amounts, for example, to 1 mm. A fine-grain catalyst powder or catalyst granules are used as the catalyst material, whose grains have a diameter of approximately 0.5 mm less. The pressing takes place, for example, at temperatures of approximately 200° C. to 500° C.

The reaction areas can be acted upon by educts by way of educt ducts 20, 21. In this case, the educts are pressed in a manner known per se through the layers 3a; in the process, they are, for example, heated and/or reacted; and are removed again by way of a product duct 22. The ducts 20, 21, 22 can be constructed such that they communicate only with certain function units 3. The construction and the manufacturing of such a system having layers 3a through which the flow can take place are described in detail in European Patent Document EP 0 906 890 A1.

It is, for example, also possible that fed educts are only heated or evaporated in a first function area 3, and are transferred by way of an inner duct (not shown in FIG. 1) into another function area, where they are catalytically reacted, in which case formed products are removed again by way of the product duct 22. This is to be illustrated by means of FIGS. 2 and 3 in which such duct systems are schematically illustrated.

Figure 2:
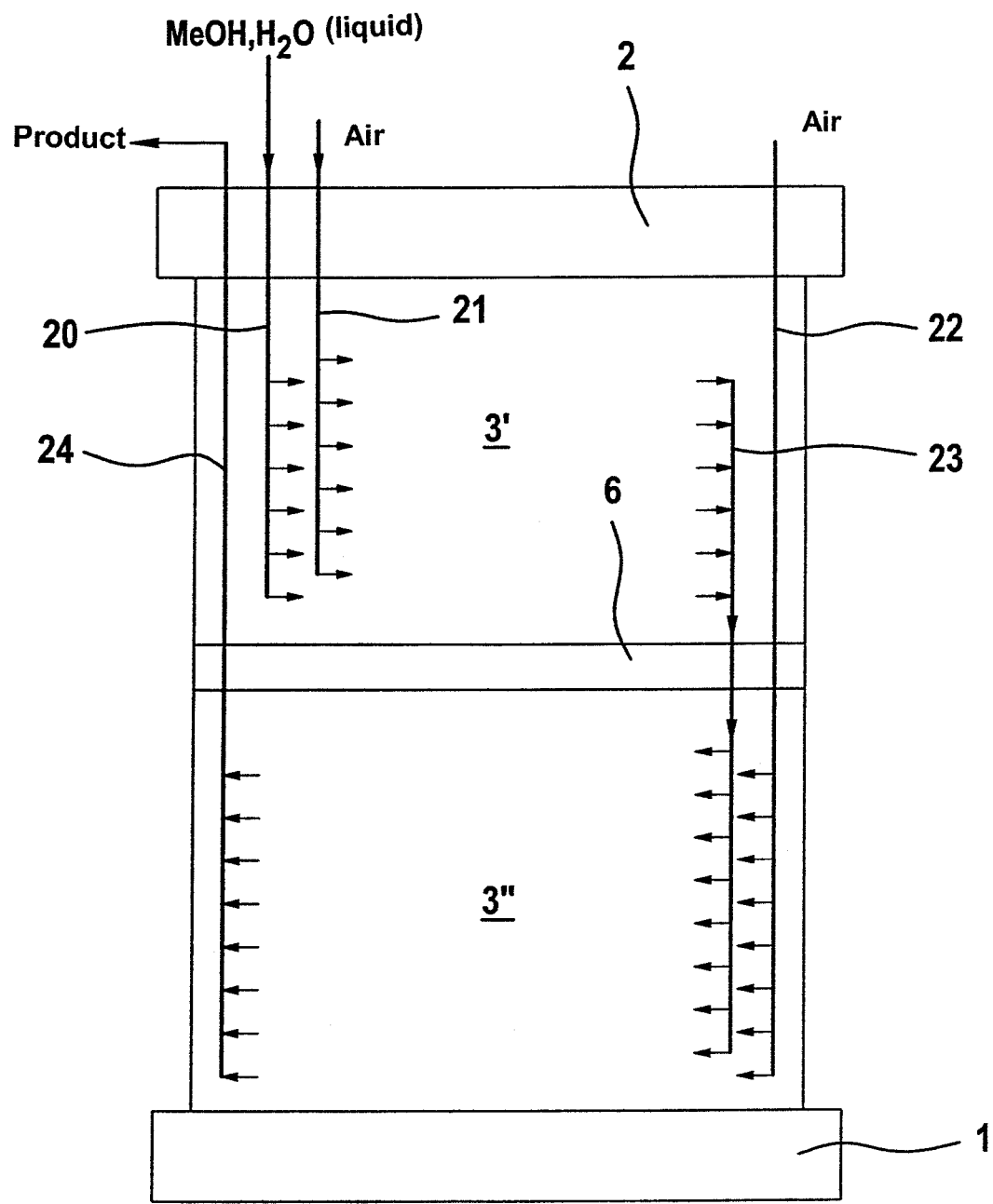
FIG. 2 is a schematic lateral view of another preferred embodiment of the system according to the invention.

The system of FIG. 2 (which is to serve as an example for generating hydrogen from a hydrocarbon, particularly methanol, and water) has an upper function area 3' which is constructed as an evaporator, and a lower reaction area 3'', which is constructed as a reactor. The two reaction areas have layers 3a, which are not shown here in detail. Because the evaporator function area 3' and the reactor function area 3'' must be used under different thermal conditions, as explained above, an insulating plate 6 is provided between these two function areas.

It is illustrated that, by way of a first educt duct 20, a liquid MeOH—$H_2O$ mixture and, by way of another educt duct 21, air can be placed in the evaporator function area 3'. The educt ducts 20, 21 communicate only with the evaporator function area 3', where the methanol is partially converted by means of the fed air and the forming heat is used for the evaporation of the remaining media.

The MeOH—$H_2O$ mixture evaporated in the evaporator function area can be transferred by way of an intermediate duct 23 from the evaporator function area 3' into the reactor function area 3''. By way of another educt duct 22, fresh air can be introduced into the reactor function area 3''. It is demonstrated that the educt duct 22 does not communicate with the evaporator function area 3'. The reaction product forming in the reactor function area 3'' as a result of the partial oxidation or autothermal reforming is removed from the illustrated system by way of a product duct 24 which does not communicate with the evaporator function area 3'.

Another preferred embodiment of the system according to the invention will now be explained by means of FIG. 3.

Figure 3:
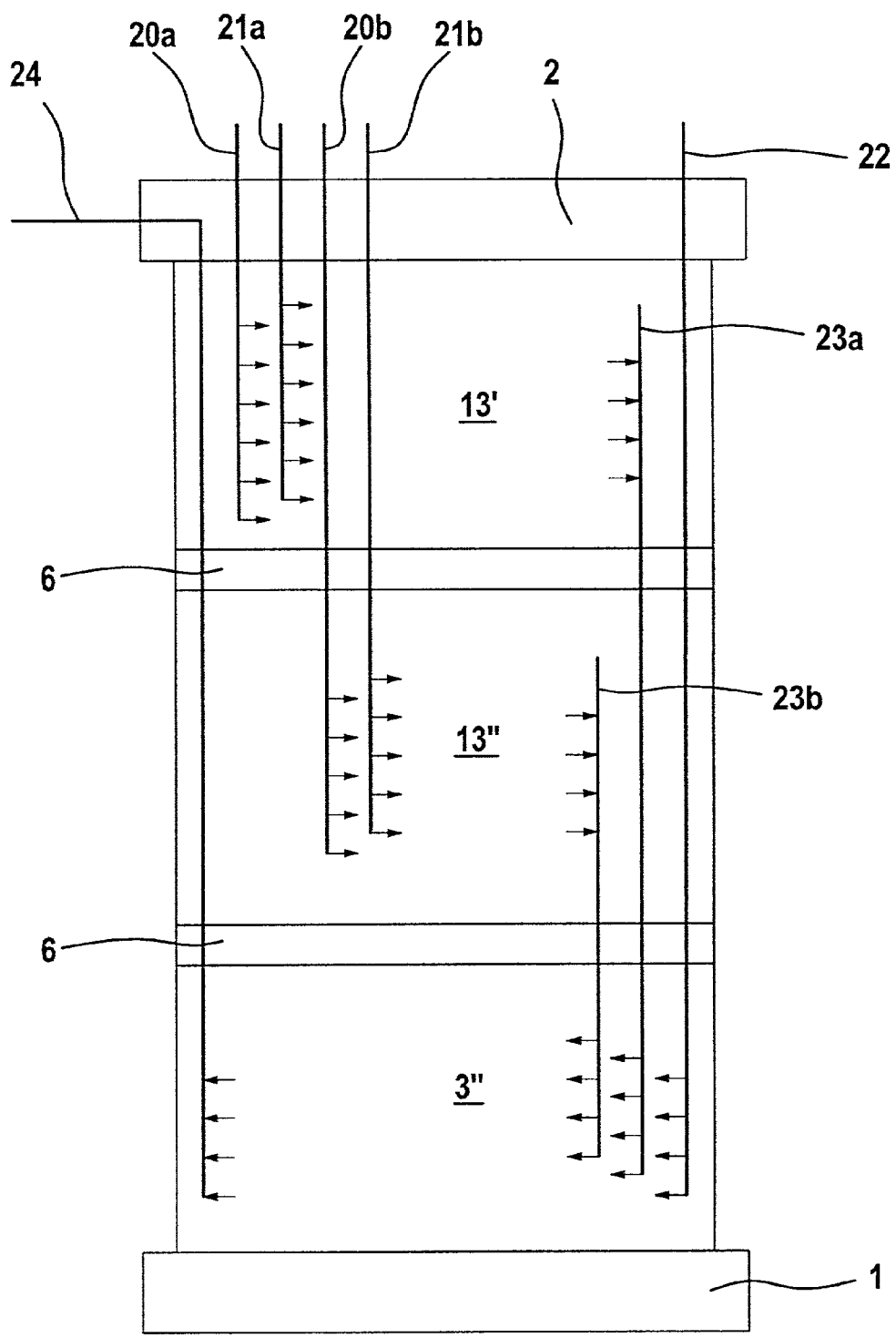
FIG. 3 is a lateral schematic view of another preferred embodiment of the system according to the invention.

In principle, the system illustrated in FIG. 3 corresponds to the system according to FIG. 2; however, two thermally mutually insulated evaporation areas 13', 13'' are provided. The respective evaporation areas 13', 13'' are constructed with separate educt ducts 20a, 21a and 20b, 21b which extend essentially parallel to one another. By way of separate ducts 23a and 23b respectively, the evaporator function areas 13' and 13'' are connected with the reactor 3''.

By means of an embodiment of this type of the system according to the invention, it is possible to admit educts, for example, to only one of the two evaporator function areas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A modular system for heating or converting at least one medium, said system comprising at least a reactor and a heat exchanger, having layers arranged in a stack which layers are formed by the pressing of catalyst material, wherein the stack includes separator devices which divide it into a plurality of function areas, the layers are arranged between a lower end plate and an upper end plate, and insulating plates are provided between the end plates and layers which are respectively adjacent to the end plates.

2. The system according to claim 1, wherein the at least one medium can be pressed through the layers, with a resulting pressure drop.

3. The system according to claim 1, wherein the at least one medium flows over the layers, with a resulting pressure drop.

4. The system according to claim 1, wherein said separator devices comprise insulating plates which divide the stacked layers into thermally mutually insulated function areas.

5. The system according to claim 4, wherein said insulating plates extend essentially parallel to the layers.

6. The system according to claim 1, wherein the end plates are made of aluminum.

7. The system according to claim 1, further comprising devices for clamping the layers between the two end plates.

8. The system according to claim 7, wherein the devices for the clamping are formed by tie rods.

9. The system according to claim 1, wherein edge areas of the layers are sealed off with respect to the environment.

10. The system according to claim 1, wherein function areas of a high temperature are formed in an interior of the stack.

11. A system including at least one of an evaporator, a reactor and a heat exchanger for heating or converting at least one medium, said system comprising:
   a plurality of layers of pressed catalyst material arranged in a stack;
   a plurality of separator devices which divide said stack into a plurality of function areas;
   a lower end plate and an upper end plate arranged at upper and lower extremities of said stack;
   insulating plates provided between the end plates and respective adjacent layers of said stack;
   devices for clamping the layers between the two end plates; and
   an insulation layer insulating said stack from a surrounding environment, said insulation layer being formed separately from said stack and laterally surrounding the stack.

12. The system according to claim 11, wherein the end plates and the devices for clamping in the layers are provided outside a thermally insulated area defined by outer insulating plates and insulation.

13. The system according to claim 1, further comprising at least one of:
   educt ducts which extend through at least a portion of the layers, by way of which educt ducts individual function areas can be selectively acted upon by respective educts;
   connection ducts which extend through at least a portion of the layers, by way of which connection ducts educts or products can be transferred from a first function area into a second function area;
   product ducts which extend through at least a portion of the layers, by way of which product ducts heated educts and reaction products can be removed from the respective function areas.

14. The system according to claim 11, further comprising, different educt ducts which selectively communicate with respective function areas for admitting an identical educt to different function areas, and different product ducts for removing the products from the respective function areas.

15. The system of claim 1, further comprising:
   an insulation layer insulating said stack from a surrounding environment, said insulation layer being formed separately from said stack and laterally surrounding the stack.

16. The system of claim 11, further comprising:
   seals arranged between the plurality of layers.

* * * * *